A. LOOMIS.
SPEEDOMETER DRIVING MECHANISM.
APPLICATION FILED JULY 5, 1912.
1,179,443.
Patented Apr. 18, 1916.
2 SHEETS—SHEET 1.
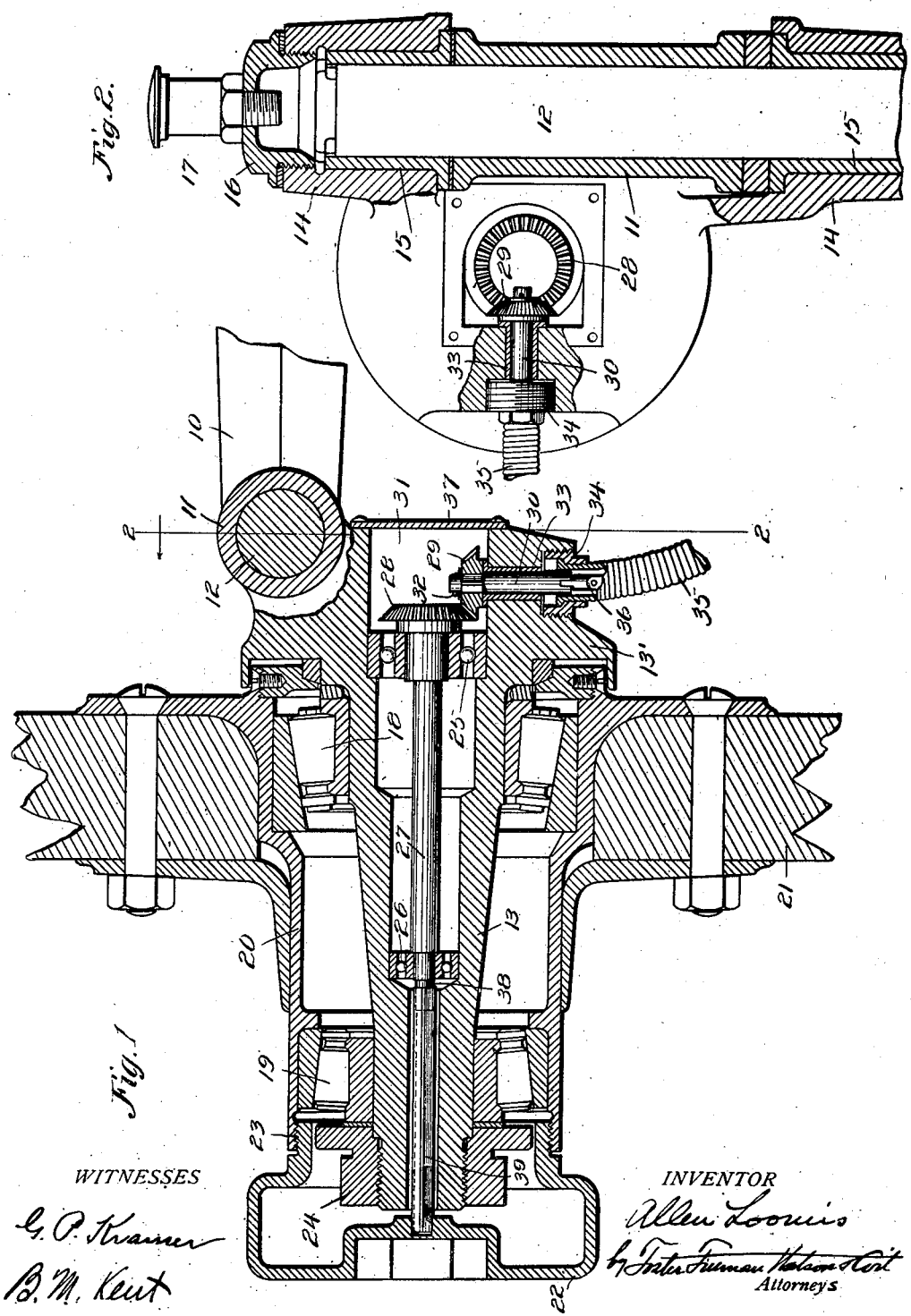

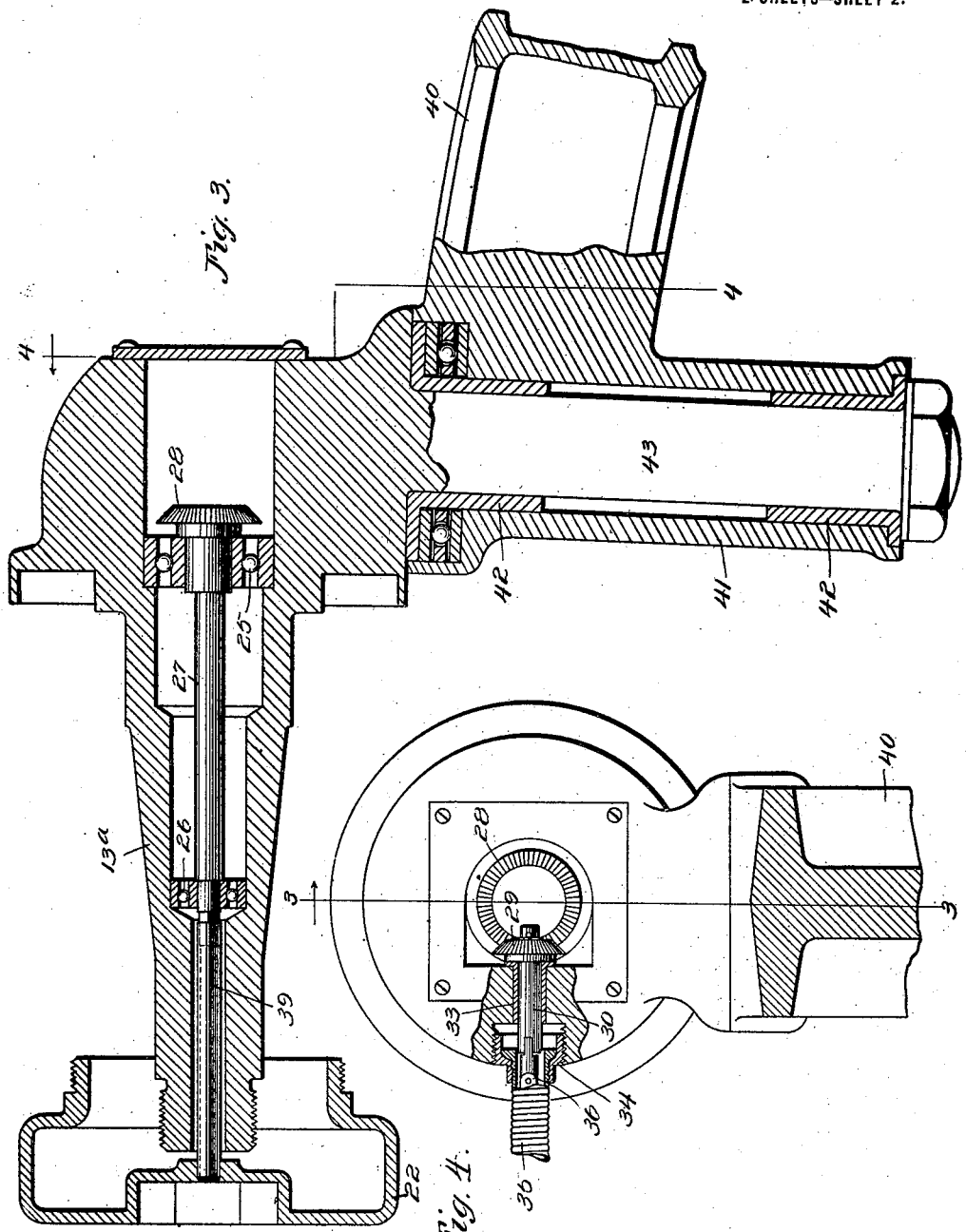

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

SPEEDOMETER-DRIVING MECHANISM.

1,179,443.   Specification of Letters Patent.   Patented Apr. 18, 1916.

Application filed July 5, 1912. Serial No. 707,932.

*To all whom it may concern:*

Be it known that I, ALLEN LOOMIS, a citizen of the United States, and resident of Detroit, Wayne county, State of Michigan, have invented a certain new and useful Improvement in Speedometer-Driving Mechanism, of which the following is a specification.

This invention relates to motor vehicles and more particularly to the steering wheels thereof and their mounting, and speedometer mechanism in said mounting.

In order that the steering mechanism may be subjected to as little strain as possible so that steering the vehicle will not be difficult, it has been customary heretofore to place the vertical axis or pivot of the steering spindle as close to the plane of the tread of the wheel as possible, and in some instances the angle between the vertical and horizontal axes of the spindle has been made less than a right angle in order to bring the point of contact of the wheel with the road approximately in line with the vertical axis. In these constructions it has been found difficult or impracticable to adapt the spindle to a speedometer driving mechanism in which the driving shaft extends through the spindle from a connection with the hub cap of the wheel to a pair of beveled gears in the inner end of the spindle. It is necessary to have a housing of some kind for these gears and because the vertical axis or pivot bolt of the spindle is so close to the wheel hub, there is little, if any, room for the gearing at that point.

It is desirable to have the speedometer driving mechanism arranged on the interior of the steering wheel spindle because this mechanism is usually of very light construction and when so arranged is thoroughly protected from injury. In order therefore to adapt the steering spindle to this type of speedometer driving mechanism I have provided the spindle with a vertical pivot bolt which is arranged wholly at one side of the horizontal axis of the spindle. This arrangement may be carried out by having what is known as a "trailing spindle" wherein the vertical axis or pivot is arranged slightly in advance of the horizontal axis around which the wheel revolves. By this arrangement the axis of the wheel is arranged slightly in the rear of the stationary axle when the wheel is in the neutral position. The arrangement may also be carried out by having the vertical axis or pivot of the spindle arranged wholly below the axis of the wheel instead of partly above and partly below as is usual.

The invention consists further in providing improved means for connecting the driving shaft with the wheel hub.

The novel features of the invention will be taken in connection with the accompanying drawings in which, Figure 1 is a horizontal section through a wheel hub mounted on a spindle of the "trailing" type; Fig. 2 is a section on the line 2—2 of Fig. 1 looking in the direction of the arrow; Fig. 3 is a vertical section of a modified form of the invention and is taken on the line 3—3 of Fig. 4; Fig. 4 is a section on the line 4—4 of Fig. 3 with certain parts broken away.

Referring to Fig. 1 of the drawings, 10 indicates the usual stationary axle at the front of the vehicle, this axle being provided at its end with the vertically arranged sleeve 11 in which is arranged pivot bolt 12. A steering spindle 13 having a base portion 13' is provided with spaced arms 14 which receive the pivot bolt 12, the arms being provided with suitable bushings 15 to act as bearings for the bolt. At the top of the upper arm 14 is a cap 16 on which may be mounted a grease cup 17 for the purpose of lubricating the bolt 12. It will be noted that the spindle is of the "trailing" type in which the axis is offset from or tangential to the axis of the bolt 12, which permits the inner end of the spindle or steering knuckle to be enlarged and provided with a cavity arranged in line with the axis of the spindle, as hereinafter described.

The spindle 13 has arranged thereon the roller bearings 18 and 19 on which is arranged the hub 20 of the wheel 21. The hub cap 22 is secured to the hub by means of screw threads 23 or any other suitable means. The wheel and the bearings are removably held in place on the spindle 13 by means of the nut 24. The spindle 13 is provided with an axle bore in which are arranged the roller bearings 25 and 26 for the speedometer driving shaft 27. The shaft 27 has mounted on the inner end thereof beyond the bearing 25 a bevel gear 28 which meshes with a gear 29 on the stub shaft 30 which is preferably arranged horizontally in the base portion 13' of the spindle. It will be seen that a cavity 31 is arranged at the inner end of the spindle and that the gears 29 and 30 are arranged in this cavity. The gear 29 is held in place on the shaft 30 by means of a suitable pin 32 which may be removed to permit the shaft to be withdrawn from its bearing in the base portion 13' of the spindle. The shaft 30 is preferably arranged in a bearing sleeve 33 and the base portion 13' of the spindle is provided with a threaded recess in axial alinement with the shaft 30 to receive the threaded sleeve 34 at the end of the flexible tube 35 in which is arranged the flexible shaft 36 which is connected with the speedometer (not shown). The end of the cavity 31 is closed by a suitable cover plate 37, and by removal of this cover plate the gears 28 and 29 are rendered accessible.

The outer end of the shaft 27 is preferably provided with a squared portion 38 which engages the square tube 39 having its outer end arranged in a suitable recess on the inner side of the hub cap 22. By this arrangement it will be seen that the shaft 27 will be driven directly by the hub cap and since the tube 39 loosely engages the end of the shaft 27 the hub cap may be readily removed, the tube 39 being removed with the cap. The removal of the hub cap does not disturb the shaft 27 or the bearings for the wheel 21.

The shafts 27 and 30 may be removed by taking off the cover plate 37 and withdrawing the pin 32. When the pin 32 has been removed the shaft 30 may be withdrawn and the gear 29 taken out. This will permit the gear 28 and the shaft 27 to be withdrawn inwardly without disturbing the hub cap or the bearings for the wheel. Since the vertical pivot of the spindle is arranged forwardly of the axis of the spindle, it will be seen that the speedometer driving mechanism is readily accessible without disturbing in any way the vertical pivot of the spindle. This arrangement also permits the vertical pivot to be arranged close to the revolving plane of the wheel and the axis of the shaft 30 may be between the plane of the wheel and a parallel plane through the vertical pivot.

Referring to Figs. 3 and 4, it will be seen that I have shown a modified form of the invention in which the stationary axle 40 is provided with the vertically arranged sleeves 41 at the ends thereof, these sleeves being provided with suitable bushings 42 to receive the vertical pivot 43 of the spindle 13ª. The arrangement of the speedometer driving mechanism in this modification is the same as that shown in Figs. 1 and 2 so that a description thereof is not necessary. From Fig. 3 it will be seen that the axis of the shaft 30 in this modification also lies between the plane of the wheel and a substantially parallel plane through the pivot 43.

Having described the invention what is claimed is:—

1. In a motor vehicle, the combination of a stationary axle having a pivot at the end thereof, a steering wheel spindle mounted on said pivot, a wheel rotatably mounted on said pivot and having a hub cap arranged at the outer end of the spindle, a shaft arranged longitudinally of said spindle and on the interior thereof and having its outer end within the spindle, and means connected with the hub cap and having a sliding connection with the end of said shaft for operatively connecting the shaft with the hub cap.

2. In a motor vehicle, the combination of a stationary axle having a pivot at the end thereof, a steering wheel spindle mounted on said pivot, a wheel rotatably mounted on said spindle and having a hub cap arranged at the outer end of the spindle, a shaft axially arranged in said spindle, and a member connected with the hub cap and extending into said spindle and having a sliding connection with the end of said shaft, whereby the shaft is adapted to be driven from the hub cap.

In testimony whereof I affix my signature in presence of two witnesses.

ALLEN LOOMIS.

Witnesses:
J. H. HUNT,
J. B. BOYCE.